UNITED STATES PATENT OFFICE.

EDUARD SCHERFF, OF WENDISCH BUCHHOLZ, PRUSSIA, GERMANY.

METHOD OF PRESERVING MILK.

SPECIFICATION forming part of Letters Patent No. 277,352, dated May 8, 1883.

Application filed June 23, 1882. (No specimens.) Patented in Germany February 20, 1880, No. 15,341; in France April 7, 1881, No. 142,183, and in England February 14, 1882, No. 717.

*To all whom it may concern:*

Be it known that I, EDUARD SCHERFF, a subject of the King of Prussia, residing in the town of Wendisch Buchholz, have invented certain new and useful Improvements in the Preservation of Milk, (for which I have received Letters Patent in the German Empire, No. 15,341, bearing date February 20, 1880, and in France, No. 142,183, bearing date April 7, 1881;) and I do hereby declare that the following is a full, clear, and exact description of the invention, which will enable others skilled in the art to which it appertains to make and use the same.

My said invention relates to improvements in the preservation of milk.

According to my German Patent No. 15,341 I employ the following method: Cold milk is filled in bottles and closed by means of a cork, which is cut off level with the mouth of the bottle, and a disk of cork of such size laid over the mouth of the said bottle that the mouth of the bottle is well covered, when the said disk is pressed firmly on the mouth of the bottle by means of one of the well-known lever-stopping devices. The bottles are now placed in an upright cylindrical receptacle provided with thermometer and manometer, the bottom and sides of which are provided with a serpentine tube. The bottom of the receptacle is covered with water, and the receptacle is then hermetically closed. Steam of more than two atmospheres' pressure is admitted at the lower part of the coil or serpentine tube, so that the water is rapidly brought to the boiling-point and heats the said coil or serpentine tube, so that the steam produced near the same can ascend, where the said steam is condensed by contact with the cold milk until the temperatures of the source of the heat and of the milk are uniform. As soon as a pressure of two atmospheres is reached the steam is cut off, so that the milk is subjected to a steam and air bath of about 100° centigrade temperature. If cold water is now admitted through the serpentine tube or coil, the manometer will in a short time show no extra pressure, during which time the bottles are slowly cooled. This produces a difference in pressure, so that the milk is so forced through the pores of the cork, which were opened by the preceding operation, that the said milk penetrates to the surface of the said cork, where butter is deposited and albumen precipitated through the tannin of the cork. The bottles are now removed from the apparatus and placed in a cool position. The milk cools, and air enters through the cork into the vacuous space so created, from which said air the sporules or germs are so perfectly filtered that the milk cannot be spoiled or injured thereby. The cork closure filters the sporules or germs; but as they remain in the said cork disk they would germinate rapidly and find their way through the cork. For this reason the cork disk, and the germs or sporules with the same, is removed, and the entrance of all further spores prevented by immediately coating the cork with paraffine.

Having now described my said invention and the means of carrying the same into effect, I desire it to be understood that what I claim, and desire to secure by Letters Patent, is—

The process of preserving milk, which consists in subjecting such milk in a tightly-corked receptacle in boiling water, then cooling the milk by cold water, or otherwise, forcing the cream through the cork, whereby the albumen is precipitated, reducing the temperature still further, whereby a vacuum is produced in the bottle and air permitted to enter, such air being filtered by passing through the cork which closes the bottle, and then coating the said cork with paraffine, substantially for the purpose set forth.

EDUARD SCHERFF.

Witnesses:
J. L. BIBO,
EDWIN A. BRYDGES.